US008856366B2

(12) United States Patent
Park

(10) Patent No.: US 8,856,366 B2
(45) Date of Patent: Oct. 7, 2014

(54) IMAGE FORMING SYSTEM TO SUPPORT A WEB SERVICE FUNCTION AND LOW POWER MODE CONTROL METHOD THEREOF

(75) Inventor: Ho-beom Park, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 907 days.

(21) Appl. No.: 12/749,698

(22) Filed: Mar. 30, 2010

(65) Prior Publication Data

US 2011/0060925 A1 Mar. 10, 2011

(30) Foreign Application Priority Data

Sep. 9, 2009 (KR) .................. 10-2009-0084916

(51) Int. Cl.
*G06F 15/16* (2006.01)
*G06F 1/32* (2006.01)
*G06F 9/48* (2006.01)

(52) U.S. Cl.
CPC .............. *G06F 1/3203* (2013.01); *Y02B 60/32* (2013.01); *G06F 1/3284* (2013.01); *Y02B 60/144* (2013.01); *Y02B 60/1267* (2013.01); *G06F 9/4843* (2013.01); *G06F 9/4893* (2013.01)
USPC ........... 709/229; 709/203; 709/227; 713/300; 713/340

(58) Field of Classification Search
CPC ................... G06F 1/3203; H04N 1/00896
USPC .......... 709/201–203, 227–229; 713/300, 320, 713/340; 358/1.14, 1.15
See application file for complete search history.

(56) References Cited

U.S. PATENT DOCUMENTS

| | | | | |
|---|---|---|---|---|
| 6,192,403 B1 * | 2/2001 | Jong et al. | ..................... | 709/229 |
| 6,925,574 B2 * | 8/2005 | Satoh | ............................. | 713/300 |
| 7,057,610 B2 * | 6/2006 | Kataoka et al. | ............... | 345/211 |
| 7,555,660 B2 * | 6/2009 | Kamisuwa et al. | ........... | 713/300 |
| 8,023,137 B2 * | 9/2011 | Yasui et al. | .................. | 358/1.15 |
| 8,352,664 B2 * | 1/2013 | Satoh | ........................... | 710/310 |
| 8,370,903 B2 * | 2/2013 | Teramoto et al. | ................. | 726/4 |
| 8,743,390 B2 * | 6/2014 | Song | ............................. | 709/201 |
| 2003/0200106 A1 * | 10/2003 | Simpson et al. | .................. | 705/1 |
| 2003/0225894 A1 * | 12/2003 | Ito | ................................. | 709/227 |
| 2004/0004732 A1 * | 1/2004 | Takeda et al. | ................. | 713/320 |
| 2005/0179935 A1 * | 8/2005 | Ogura et al. | .................. | 713/320 |
| 2008/0198397 A1 * | 8/2008 | Watanabe | .................... | 358/1.14 |
| 2010/0067043 A1 * | 3/2010 | Sasaki | .......................... | 358/1.15 |
| 2010/0161808 A1 * | 6/2010 | Kwon | ........................... | 709/227 |

* cited by examiner

*Primary Examiner* — Bharat N Barot
(74) *Attorney, Agent, or Firm* — Stanzione & Kim, LLP

(57) ABSTRACT

An image forming system to support a web service function includes a first web server operated under a low power mode to provide a web service, a webpage provider to provide a webpage as a web service through the first web server, and a controller to control the first web server to provide a web service when a web service request command is received in the low power mode. Therefore, it is possible to effectively operate the image forming system under the low power mode.

33 Claims, 14 Drawing Sheets

FIG. 4

```
<html>
<head>
<title>SWS-Information-Network Information</title>
<meta http-equiv="Content-Type" content="text/html; charset=utf-8">      310
</head>
<body>
The mode of this system is changed from the standby mode to the service mode.
<br>
<br>                                                                    320
<script language="JavaScript" type="text/javascript">
<!--
/ar countDownInterval=5;
/ar countDownTime=countDownInterval+1;
Function countDown(){
        countDownTime--;
        if (countDownTime <=0){
                countDownTime=countDownInterval;
                 clear Timeout(counter)
                 window.location="http://168.219.183.153";
                 return
        }
        if (document.all) //if IE 4+
                document.all.countDownText.innerText=countDownTime+" ";
        else if (document.getElementById) //else if NSG+
                document.getElementById("countDownText").innerHTML=countDownTime+" "
        else if (document.layers){
                document.c_reload.document.c_reload2.document.write(
                        '<b id="countDownText">'+countDownTime+' Access to a web
                         browser will be performed in </b> seconds')
                document.c_reload.document.c_reload2.document.close()
        }
        counter=setTimeout("countDown()", 1000);
}
Function startit(){
        if (document.all IIdocument.getElementById)
                document.write('<b id="countDownText">'+countDownTime+' Access to a web
                 browser will be performed in </b> seconds')
        countDown()
}
if (document.all IIdocument.getElementById)
        startit()
else
        window.onload=startit setTimeout("location.hreg='http://168.219.183.153'", t)
//-->
</script>

<!--copyright start-->
<p>Copyrights @ 1995-2009 SAMSUNG.ALL rights reserved.</p>
<!--copyright end-->

</table>

</body>
</html>
```

FIG. 5

```
<html>
<head>
<title>SWS-Information-Network Information</title>                    420
<meta http-equiv="Content-Type" content="text/html; charset=utf-8">
<meta http-equiv="refresh" content="10; url=http://168.219.183.153/"><!--use html meta tag-->
</head>
<body>
The mode of this system is changed from the standby mode to the service mode.
Re-access to a web browser will be performed in 5 seconds.
<br>
<br>                                                                  410
<script language="JavaScript" type/javascript">
<!--
//-->
</script>

<!--copyright start-->
<p>Copyrights c 1995-2009 SAMSUNG.ALL rights reserved.</p>
<!--copyright end-->

</table>

</body>
</html>
```

IMAGE FORMING SYSTEM TO SUPPORT A WEB SERVICE FUNCTION AND LOW POWER MODE CONTROL METHOD THEREOF

CROSS-REFERENCE TO RELATED APPLICATIONS

This application claims priority under 35 U.S.C. §119 (a) from Korean Patent Application No. 10-2009-0084916, filed on Sep. 9, 2009, in the Korean Intellectual Property Office, the disclosure of which is incorporated herein by reference in its entirety.

BACKGROUND

1. Field of the Invention

The present general inventive concept relates to an image forming system and a low power mode control method thereof. More particularly, the present general inventive concept relates to an image forming system to provide a web service function and a low power mode control method in the image forming system.

2. Description of the Related Art

Recently, there is an ever increasing need to reduce power consumption in all kinds of electronic goods. However, if electronic goods do not meet low power consumption, it is impossible to sell these electronic goods due to legal regulation in spite of their advantages in performance and price.

A commonly applicable specification requires a standby power consumption of about 1-2 W according to the type of apparatuses, and may require power consumption below 1 W in a standby mode in which network services will be provided. Accordingly, all electronic companies have studied various methods to achieve power consumption below 1 W in the standby mode.

To realize a low power standby mode, companies utilize various methods. For example, if a system including a main central processing unit (CPU) with high performance and an auxiliary CPU with low power consumption is in a normal mode, the main CPU may provide services. Alternatively, if the system enters the standby mode according to specific conditions, the auxiliary CPU may be used to cut off power of the main CPU and unnecessary system and to monitor service requests. In this situation, if a user requests a service, the auxiliary CPU may apply the power to the main CPU and auxiliary circuits, so as to provide the user with the requested service.

However, to shift the standby mode of the system to the normal mode in response to the service request, a long period of time (greater than about 10 seconds) is required to perform booting when the power is applied to the main CPU again. For example, if an apparatus provides a service via a network, such as a local network, wide area network, or the Internet, a time greater than about 10 seconds may be required for a consumer to access the apparatus through a browser and receive the service. Consequently, the consumer may determine that the apparatus has malfunctioned. Additionally, the consumer may feel inconvenienced when the web service is delayed for a time greater than two to three seconds. Therefore, there is a need for methods to avoid these inconveniences so that a user may use an apparatus regardless of whether the apparatus is in the low power mode or a normal operation mode.

SUMMARY

The present general inventive concept provides an image forming system to provide a webpage image during switching from a low power mode to a normal mode, and a method to control the low power mode in the image forming system.

Additional features and utilities of the present general inventive concept will be set forth in part in the description which follows and, in part, will be obvious from the description, or may be learned by practice of the general inventive concept.

Exemplary embodiments of the present general inventive concept may be achieved by providing an image forming system to support a web service function, the image forming system including a first web server operated under a low power mode to provide a web service, a webpage provider to provide a webpage to be serviced through the first web server, and a controller to control the first web server to provide a web service when a web service request command is received in the low power mode.

The image forming system may further include a second web server operated under a normal mode to provide a web server.

The controller may control the second web server to provide a web service when a web service request command is received in the normal mode.

The image forming system may further include a display unit to display the webpage provided under the low power mode.

The webpage provider may provide a webpage previously created in the normal mode, or may create and provide a webpage in real-time in the low power mode.

The webpage provider may provide a webpage stored as a default.

The webpage provided by the webpage provider may include a status display area to display a status in which the low power mode is shifted to the normal mode.

The webpage provided by the webpage provider may include a re-access area to retry access to a web browser after a preset period of time elapses. The re-access area may be written in at least one of a script language and an HTTP meta tag.

Features and/or utilities of the present general inventive concept may also be achieved by providing an image forming apparatus including a user interface to receive a web service request command, a webpage provider to provide a webpage to be serviced under a low power mode, and a controller to operate and control a first web server to service the webpage provided by the webpage provider when the web service request command is received in the low power mode.

The controller may operate and control a second web server to provide a web service when the web service request command is received in a normal mode.

At least one of the first web server and the second web server may be built in the image forming apparatus.

The webpage provided by the webpage provider may be at least one of a webpage previously created in the normal mode, a webpage created in real-time in the low power mode, and a webpage stored as a default.

The webpage provided by the webpage provider may include a status display area to display a status in which the low power mode is shifted to the normal mode.

The webpage provided by the webpage provider may include a re-access area to retry access to a web browser after a preset period of time elapses. The re-access area may be written in at least one of a script language and an HTTP meta tag.

Features and/or utilities of the present general inventive concept may also be achieved by providing a low power mode control method in an image forming system to support a web service function, the method including receiving a web service request command under a low power mode, switching from the low power mode to a normal mode and providing a webpage related to the mode shift in the low power mode, and displaying the provided webpage during the mode shift.

A web service in the low power mode and a web service in the normal mode may be provided by different web servers.

The webpage provided in the low power mode may be a webpage previously created in the normal mode.

The webpage provided in the low power mode may be a webpage created in real-time in the low power mode.

The webpage provided in the low power mode may be a webpage stored as a default.

The webpage related to the mode shift may include a status display area to display a status in which the low power mode is shifted to the normal mode.

The webpage related to the mode shift may include a re-access area to retry access to a web browser after a preset period of time elapses. The re-access area may be written in at least one of a script language and an HTTP meta tag.

Therefore, it is possible to effectively operate the image forming system under the low power mode.

Features and/or utilities of the present general inventive concept may also be realized by an image-forming apparatus having a high-power operation mode and a low-power operation mode, the image-forming apparatus including a webpage provider to provide a webpage in each of the high-power and low-power modes and a first web server to receive the webpage from the webpage provider in the low-power mode and to output the webpage to a network.

The webpage provider may provide a pre-generated webpage stored in memory when the image-forming apparatus is in the low-power mode.

The image-forming apparatus may further include a second web server to receive the webpage from the webpage provider when the image-forming apparatus operates in the high-power operation mode.

The image-forming apparatus may further include a controller to receive a request to access the webpage and to transmit the request to the first web server.

The controller may include a first controller to operate at a high power level in the high-power operation mode and a second controller to operate at a low power in the low-power operation mode.

When the image-forming apparatus is in a low-power state, the first controller may generate the webpage according to data received from the webpage provider and transmits the webpage to the first web server.

Each of the webpage provider and the first web server may be a component located inside a body of the image-forming apparatus.

At least one of the webpage provider and the first web server may include a computer program stored in a memory and a processor to access data from the computer program to provide or receive the webpage, respectively.

The image-forming apparatus may further include a display to receive the webpage from the first web server and to display the webpage.

The image-forming apparatus may further include a controller including a first controller to operate at a high power level in the high-power operation and a second controller to operate at a low power in the low-power operation, and the webpage may include a first webpage and a second webpage.

When the image-forming apparatus is in a low-power operation mode, the second controller may transmit the first webpage received from the webpage provider to the display, and after the first webpage received from the webpage provider is transmitted to the display, if an input is received by the controller to generate the second webpage in the high-power operation mode, the first controller may generate the second webpage in the high-power operation mode based on webpage data received from the webpage provider.

Features and/or utilities of the present general inventive concept may also include a method to provide a webpage from an image-forming system having a high-power mode and a low-power mode, the method including receiving a request to transmit a requested webpage from a webpage provider in the image-forming system, determining whether the image-forming system is in the high-power mode or the low-power mode, and if the image-forming system is in the low-power mode, changing the system to the high-power mode to provide the requested webpage.

Providing the requested webpage may include one of retrieving a pre-generated webpage from memory and generating a webpage based on data in the request to transmit the requested webpage.

If it is determined that the image-forming system is in the low-power mode, a pre-generated webpage may be retrieved from memory, and if it is determined that the image-forming system is in the high-power mode, the requested webpage may be generated based on data in the request to transmit the requested webpage.

The method may further include, if it is determined that the image-forming system is in the low-power mode, retrieving a pre-generated webpage from memory, the pre-generated webpage having a field to receive a user input to change the image-forming system to the high-power mode to generate the requested webpage.

The method may include, if a user input is detected before the requested webpage is provided in the low-power mode, changing to the high-power mode to provide the requested webpage.

Features and/or utilities of the present general inventive concept may also include a method to provide a webpage from an image-forming system having a high-power mode and a low-power mode, the method including receiving a request to transmit a requested webpage from a webpage provider in the image-forming system, determining whether the image-forming system is in the high-power mode or the low-power mode, if the image-forming system is in the low-power mode, beginning to generate the requested webpage in the low-power mode, and if an input is received before the requested webpage is generated, switching to the high-power mode to generate the requested webpage.

The method may further include transmitting a pre-generated webpage before generating the requested webpage.

BRIEF DESCRIPTION OF THE DRAWINGS

Exemplary embodiments of the present general inventive concept will become apparent and more readily appreciated from the following description of the exemplary embodiments, taken in conjunction with the accompanying drawings of which:

FIGS. 4 and 5 exemplarily illustrate webpages provided in a low power mode according to an exemplary embodiment of the present general inventive concept;

DETAILED DESCRIPTION OF THE EMBODIMENTS

Figure 1A:
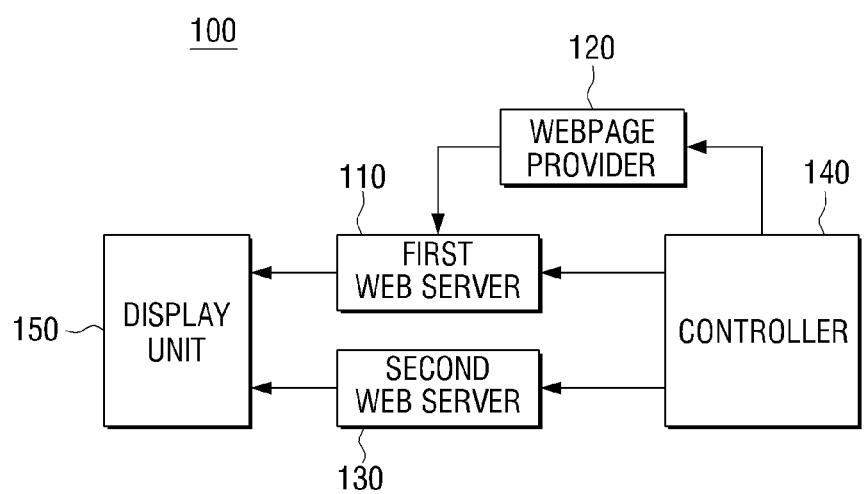
FIGS. 1A-1D illustrate block diagrams of image forming systems according to exemplary embodiments of the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1A is a block diagram illustrating an image forming system 100 according to an exemplary embodiment of the present general inventive concept.

The image forming system 100 illustrated in FIG. 1A includes a first web server 110, a webpage provider 120, a second web server 130, a controller 140, and a display unit 150.

The image forming system 100 may be implemented by combining an image forming apparatus, a host device, and a network. The image forming apparatus may perform operations relating to a function of forming image data, for example, a scanning function, a printing function, a faxing function, and may include, for example, a scanner, a printer, a facsimile machine or a multifunction peripheral (MFP). The host device may be a personal computer (PC). Additionally, the network refers to almost all types of communication network for wired or wireless connection, for example a wireless communication network, such as the Internet, a local area network (LAN), a wide area network (WAN), a communication network formed by connecting the same or similar LANs via bridges, a communication network formed by connecting different LANs via gateways, and a Bluetooth. Furthermore, the network may include a local interface such as a universal serial bus (USB) or parallel port.

The image forming system 100 can support a web service through a web browser, and can provide a low power mode.

The low power mode (or a standby Application Hosting Environment (AHE)) refers to an operation mode to cut off or minimize power supply to most modules to reduce power consumed when a system does not perform any operation. In the low power mode, in order to achieve much lower standby power consumption, power supply to a main memory (generally, an external dynamic random access memory (DRAM)) may be cut off, or a current mode is switched to a self refresh mode to launch a program in an internal memory (generally, an internal static random access memory (SRAM)) which is not used in a system on chip (SOC).

In more detail, in the low power mode, a frequency of a main controller may be lowered, or gated clocks may be configured in designing a main controller so that blocks which are not operated in the low power mode may prevent input of clocks. Alternatively, when both a main controller and an auxiliary controller exist, power supply to constituents other than the auxiliary controller may be cut off in the low power mode.

Various mode shift events may occur. For example, in the case of a printer, events such as an input of a panel key, an image forming service request, or fax ring may occur.

The first web server 110 can be operated in the low power mode and can provide a web service. More specifically, if a web service request command is received in the low power mode, the first web server 110 may provide a web service under the low power mode. Herein, the first web server 110 may be implemented, for example, as a micro HTTP server.

The second web server 130 can be operated in a normal mode and can provide a web service. More specifically, if a web service request command is received in the normal mode, the second web server 130 may provide a web service under the normal mode. Herein, the second web server 130 may be implemented, for example, as an HTTP server.

The first web server 110 and the second web server 130 may be implemented, for example, as embedded web servers (EWSs) in an image forming apparatus, or as web servers connected over a network.

The webpage provider 120 can provide a webpage serviced in the low power mode, and more specifically, can provide a webpage related to mode shift. The webpage provider 120 may be included, for example, in an image forming apparatus.

The webpage provider 120 can create a webpage in the low power mode in real-time, to provide the created webpage. Additionally, the webpage provider 120 can copy a webpage created in the normal mode from a memory to provide the copied webpage, or can simply load a webpage previously stored in a memory to provide the loaded webpage.

The controller 140 may include a main controller only, or may include both a main controller and a sub-controller.

In the image forming system 100 of FIG. 1A, the controller 140 includes a main controller only.

The low power mode may be implemented in such a manner to reduce a frequency of the main controller 140 or to configure gated clocks in designing a main controller so that blocks which are not operated in the low power mode may prevent input of clocks.

The first web server 110 has a function of processing the minimum HTTP protocol and a function of transmitting the webpage provided by the webpage provider 120 to a web browser, and can provide a web service under the low power mode accordingly.

The webpage provided by the webpage provider 120 may include a status display area to notify that the mode is currently shifted.

Additionally, the webpage provided by the webpage provider 120 may include a re-access area to retry access to the web browser after a preset period of time elapses.

According to the system configuration, the webpage provider 120 may be included on a main firmware configured to control the normal mode, or may be included together with the first web server 110 on a micro firmware configured to control the low power mode.

In the image forming system of FIG. 1A, the controller 140 includes the main controller only, and accordingly the main firmware configured to control the normal mode and the micro firmware configured to control the low power mode may be implemented in a single chip.

When the main firmware and the micro firmware are implemented in a single chip, the low power mode may be implemented in such a manner to reduce a frequency of the main controller or to configure gated clocks in designing a main controller so that blocks which are not operated in the low power mode may prevent input of clocks, as described above. In this situation, the micro firmware may be loaded into the internal SRAM of the main controller. Since the SRAM retains information stored therein even when not refreshed, the SRAM is faster than the DRAM. Accordingly, in the SRAM, the low power mode may be rapidly shifted to the normal mode.

If the webpage provider 120 is included on the main firmware, the webpage provider 120 may create a webpage in the normal mode, and may store the created webpage. Additionally, the webpage provider 120 may copy or simply load the webpage stored in the low power mode to provide the copied or loaded webpage.

Alternatively, if the webpage provider 120 is included on the micro firmware (namely, the sub-firmware), the webpage provider 120 may create a webpage to provide the created webpage in the low power mode.

However, in some cases, the webpage provider 120 may copy or simply load a webpage stored as a default in manufacturing a non-volatile memory such as a read-only-memory (ROM), rather than creating a webpage.

Furthermore, exemplary embodiments of the present general inventive concept may equally be applied to a situation in which the webpage provider 120 is included on both the main firmware and the micro firmware.

The webpage provider 120 may include a program stored in memory to access or create a webpage using data stored in memory, supporting logic devices, and one or more processors. The first and second web servers 110 and 130 may include programs stored in memory to control access to data to be transmitted over a network, such as the World Wide Web. The web servers 110 and 130 may also include supporting logic circuits and processors to access and manipulate data stored in memory. The controller 140 may include one or more processors, supporting logic, and memory circuits to receive data, commands, and addresses, and to control access to and operation of the webpage provider 120, the first web server 110, and the second web server 130.

Figure 8:
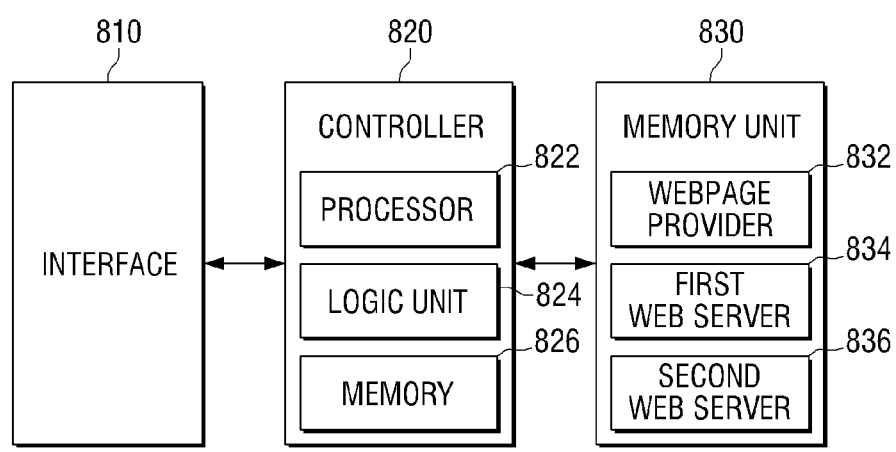
FIG. 8 illustrates an example of a webpage retrieving portion of an imaging apparatus according to an example of the present general inventive concept.

FIG. 8 illustrates an example of a physical configuration of a webpage accessing portion of an image-forming system. The controller 820 may receive a request to access a webpage via the interface 810. The interface 810 may include an electrical interface with another device, a data port, or a physical user interface such as a keypad, touch screen, or a display. The controller 820 may include a processor 822, a logic unit 824, and memory 826, such as cache memory, ROM, RAM, FLASH memory, or any other type of data storage. The controller 820 determines that the request is for first or second web server program 834 or 836 stored in the memory unit 830, and accesses the first or second web server 834 or 836, respectively. The controller 820 processes the first or second web server program 834 or 836 to control the webpage provider 832 to provide a webpage. The webpage provider 832 may include addresses, webpage formation data, or other data to access or create a webpage. The controller 820 may access or create the requested webpage using the data obtained from the webpage provider 832 and may transmit the webpage to the interface 810.

Although FIG. 8 illustrates the webpage provider 832, first web server 834, and second web server 836 as being stored as programs in the memory unit 830, each of the webpage provider 832, first web server 834, and second web server 836 may include separate components including processors, logic units, and memory chips to perform the functions of generating, storing, and accessing data.

The display unit 150 can display the webpage provided by the first web server 110 on a screen in the low power mode, and can display the webpage provided by the second web server 130 on the screen in the normal mode.

The display unit 150 can also display a menu screen showing various functions provided by the image forming system 100. The display unit 150 may be implemented as a liquid crystal display (LCD), or as a cathode-ray tube (CRT), a plasma display panel (PDP) or an organic light emitting diode (OLED). Additionally, the display unit 150 may be implemented as a touch screen to detect a user's touch.

Figure 1B:
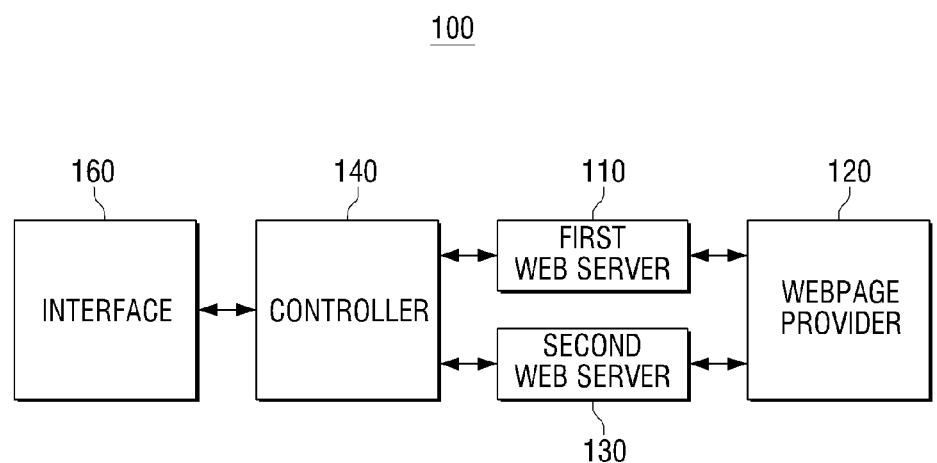

FIG. 1B illustrates an image-forming system 100 according to another embodiment of the present general inventive concept. As illustrated in FIG. 1B, the controller 140 receives a request from an interface 160, which may include a data port, display, or other interface hardware, to access a webpage. The controller 140 may determine which of the first and second web servers 110 or 120 will process the request depending on whether the image-forming system 100 is in a high-power mode or a low-power mode. The first or second web server 110 or 120 may then access the webpage provider 120 which may then provide the webpage to the web server 110 or 130, the controller 140, and ultimately to the interface 160.

Figure 1C:
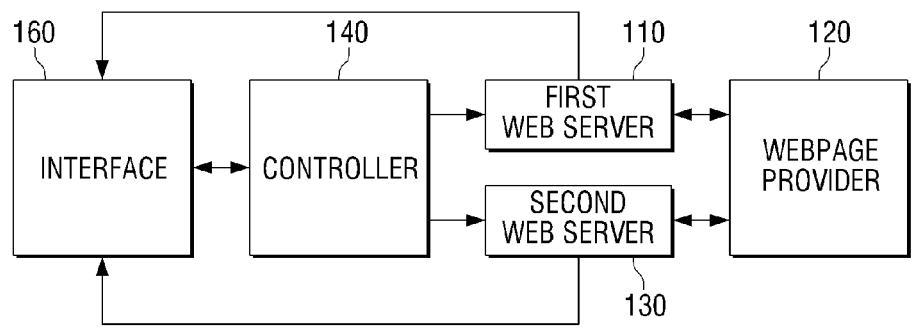

FIG. 1C illustrates an image-forming system 100 similar to that of FIG. 1B, except that, after receiving the webpage from the webpage provider 120, the first or second web server 110 or 130 may transmit the webpage directly to the interface 160.

Figure 1D:
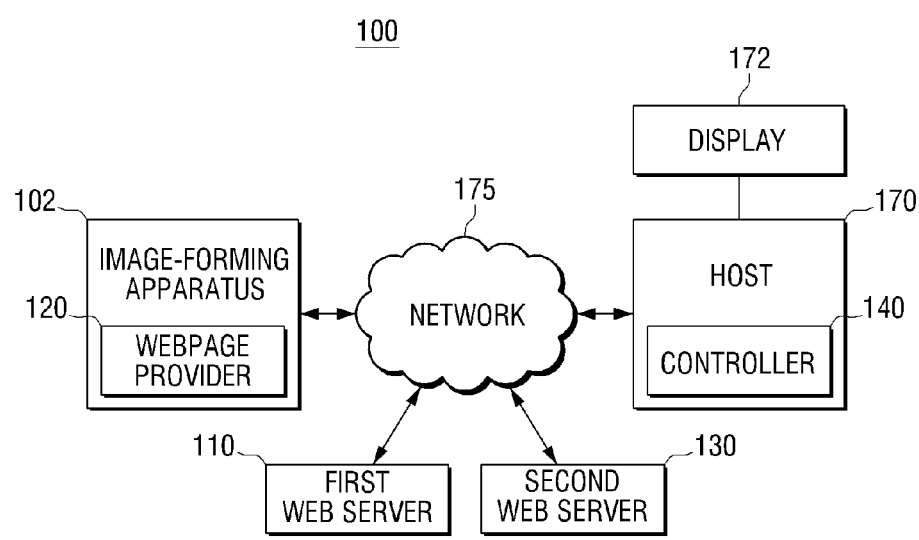

FIG. 1D illustrates yet another embodiment of the present general inventive concept in which the first and second web servers 110 and 120 are remotely connected to the image-forming apparatus 102 via a network 175. A host 170 including a controller 140 may initiate a request for a webpage. The controller 140 may determine whether the system 100 is in a low-power mode or a high-power mode and may transmit the request to one of the first and second servers 110 or 130 accordingly. The first or second server 110 or 130 may communicate with the webpage provider 120 of the image-forming apparatus 102 to retrieve the requested webpage. The first or second server 110 or 130 may then transmit the webpage to the host 170 which may display the webpage on the display 172.

The image-forming apparatus 102 may have a physical structure, shell, cover, or body, as represented by the box in FIG. 1D. One or more of the first and second server 110 and 130, the webpage provider 120, and the controller 140 may be components of the image-forming apparatus 102 and they may be located within the body of the image-forming apparatus 102. Alternatively, as illustrated in FIG. 1D, one or more of the above functional units may be located outside the body of the image-forming apparatus 102 and may be connected to the image-forming apparatus 102 via a network.

Although FIGS. 1A-1D illustrate example configurations of an image-forming system, any configuration may be used. For example the system may include additional web servers, web providers, or controllers. A webpage provider 120 may be connected to an image forming apparatus 102 via a network, and the web servers 110 and 130 may be components of a host 170. Alternatively, one or more of the webpage provider 120 and the first and second web server 110 and 130 may be components of a controller 140. In other words, FIGS. 1A-1D are provided as examples and do not limit the scope of the present general inventive concept to the illustrated examples.

Figure 2:
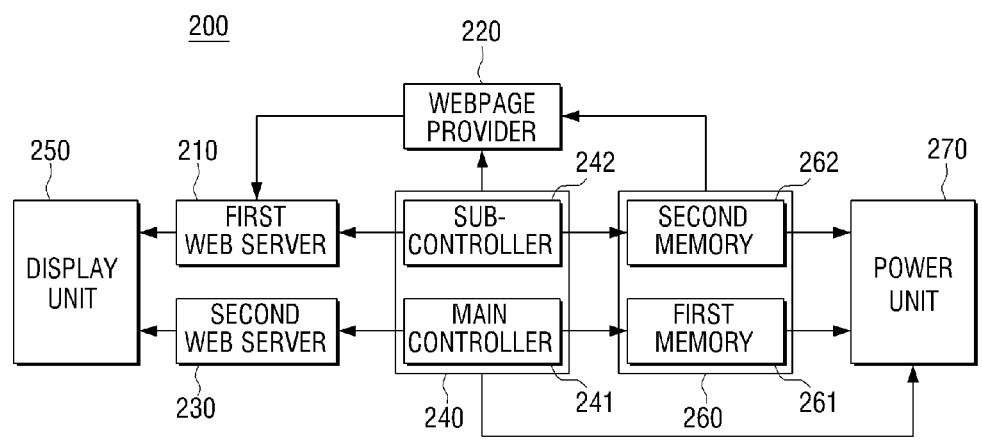
FIG. 2 is a block diagram illustrating an image forming system according to another exemplary embodiment of the present general inventive concept.

FIG. 2 is a block diagram illustrating an image forming system 200 according to another exemplary embodiment of the present general inventive concept. Detailed descriptions on the constituents overlapping with those in FIG. 1 shall be omitted here.

The image forming system 200 of FIG. 2 includes a first web server 210, a webpage provider 220, a second web server 230, a controller 240, a display unit 250, a storage unit 260, and a power unit 270.

In the image forming system 200 of FIG. 2, the controller 240 includes a main controller 241 and a sub-controller 242. In this situation, the low power mode may be implemented using a method by which the power unit 270 cuts off power supply to the constituents other than the sub-controller 242. The power connections between the power unit 270 and the remaining functional units are omitted for clarity. However, the power unit 270 may supply power to each unit of the image-forming system 200.

When the main controller 241 and the sub-controller 242 are separately included as illustrated in FIG. 2, if no service request is sent to the image forming system 200 for a preset period of time, the power unit 270 may cut off the power to the main controller 241, but continue to supply the power to the sub-controller 242, so that the low power mode may be implemented. The sub-controller 242 may control operation of the image forming system 200 only in the low-power mode or may control some functions in the normal or high-power mode.

The sub-controller 242 can automatically respond to a request from a general address resolution protocol/Internet control message protocol (ARP/ICMP). However, if a preset condition is satisfied, for example if an image forming request is received, the power unit 270 may apply the power to the main controller 241, so that the requested service may be performed.

When switching from the low power mode to the normal mode, the main controller 241 may be newly booted. A time required to boot the main controller 241 may be determined according to the specifications of a particular system, but in the case of an image forming system of a server message block (SMB) type, a time greater than about 10 seconds may be typically required to prepare a system service.

Additionally, if a user attempts to access to a webpage using a web browser, a time greater than several minutes (for example, 1-2 minutes) may be required. In this situation, if the main controller 241 is completely booted, a web service may be provided in the normal mode.

The image forming system 200 of FIG. 2 includes both the main controller 241 and the sub-controller 242, and accordingly a main firmware configured to control the normal mode and a micro firmware configured to control the low power mode may be implemented in different chips.

When the main firmware and the micro firmware are implemented in different chips, the low power mode may be implemented in such a manner to cut off the power to the main controller 241 including the main firmware.

In this situation, if the webpage provider 220 is included on the main firmware, the webpage provider 220 may create a webpage to store the created webpage in the normal mode, under the control of the main controller 241. In the low power mode, the sub-controller 242 may copy or simply load the stored webpage, and may provide the copied or loaded webpage.

Alternatively, if the webpage provider 220 is included on the micro firmware (namely, the sub-firmware), the webpage provider 220 may create a webpage and provide the webpage in real-time in the low power mode.

However, in some cases, the webpage provider 220 may provide a webpage previously stored in manufacturing a non-volatile memory such as a ROM, rather than creating a webpage.

Furthermore, exemplary embodiments of the present general inventive concept may equally be applied to a situation in which the webpage provider 220 is included on both the main firmware and the micro firmware.

The storage unit 260 may include a first memory 261 and a second memory 262. The first memory 261 can store programs or applications required to operate the normal mode, and the second memory 262 can store programs or application required to operation the low power mode.

The power unit 270 can cut off power supply to the first memory 261 but continue to supply the power to the second memory 262 under the control of the controller 240, so that the sub-controller 242 can be operated in the low power mode.

The constituents and the arrangement of the constituents illustrated in FIGS. 1 and 2 are merely an example, and accordingly part of the constituents may be deleted, or other constituents may be added, or the arrangement of the constituents may be changed.

Figure 3:
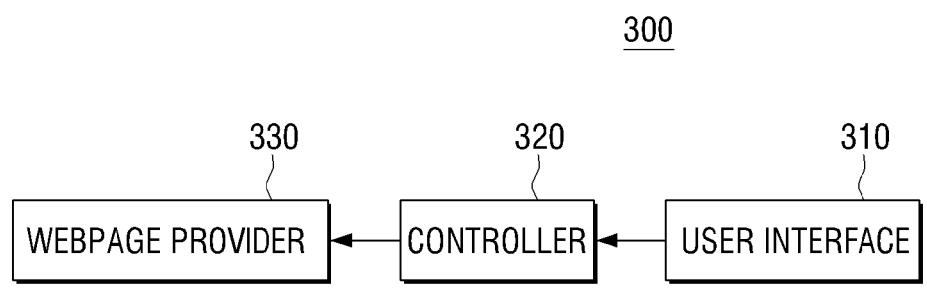
FIG. 3 is a block diagram illustrating an image forming apparatus according to an exemplary embodiment of the present general inventive concept.

FIG. 3 is a block diagram illustrating an image forming apparatus 300 according to an exemplary embodiment of the present general inventive concept.

The image forming apparatus 300 of FIG. 3 includes a user interface 310, a controller 320 and a webpage provider 330.

The user interface 310 can receive a web service request command, and can receive a user command through an input unit (not illustrated) in the image forming apparatus 300, or through a host device (not illustrated).

If the web service request command is received under the low power mode, the controller 320 may operate and control a first web server (not illustrated) to service a webpage provided by the webpage provider 330.

In response to the web service request command, the controller 320 may control the low power mode to be shifted to the normal mode.

The webpage provider 330 functions to provide a webpage under the low power mode, and more specifically, can provide a webpage related to the mode shift.

A display unit (not illustrated) can display the webpage which is provided during the mode shift.

Additionally, if the web service request command is received under the normal mode, the controller 320 may operate and control a second web server (not illustrated) to provide a web service.

At least one of the first web server and the second web server may be built in the image forming apparatus 300. In some cases, the first web server and the second web server may be web servers connected via the network.

The webpage related to the mode shift may be a webpage previously created in the normal mode, or a webpage created in real-time in the low power mode, or a webpage stored as a default.

Furthermore, the webpage related to the mode shift may include a status display area to display the status in which the low power mode is shifted to the normal mode, and/or a re-access area to retry access to a web browser after a preset period of time elapses.

In this situation, the re-access area may be written in at least one of a script language and an HTTP meta tag.

FIGS. 4 and 5 exemplarily illustrate webpages provided in the low power mode according to an exemplary embodiment of the present general inventive concept.

A webpage illustrated in FIG. 4 is written using a JavaScript language. Referring to FIG. 4, a webpage provided in the low power mode may include a status display area 310 to display a status in which a standby mode (namely, a low power mode) is shifted to a service mode (namely, a normal mode), and a re-access area 320 to retry access to a web browser after a preset period of time elapses.

A webpage illustrated in FIG. 5 is written using a Meta tag. Referring to FIG. 5, a webpage provided in the low power mode may include a re-access area 410 to retry access to a web browser after a preset period of time elapses, and a status display area 420 to display a status in which a standby mode (namely, a low power mode) is shifted to a service mode (namely, a normal mode).

Figure 6A:
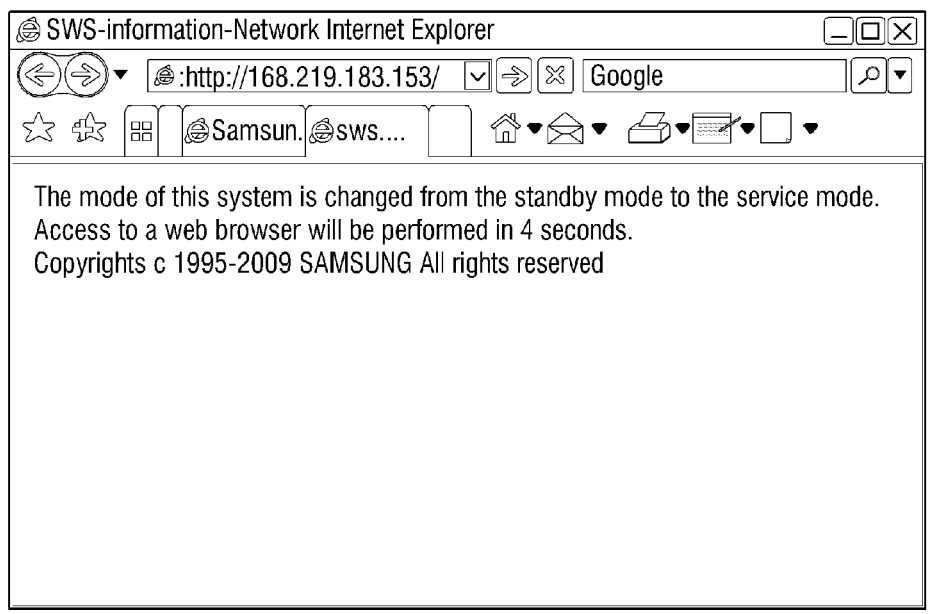
FIGS. 6A to 6C exemplarily illustrate web browsers according to an exemplary embodiment of the present general inventive concept.
Figure 6B:
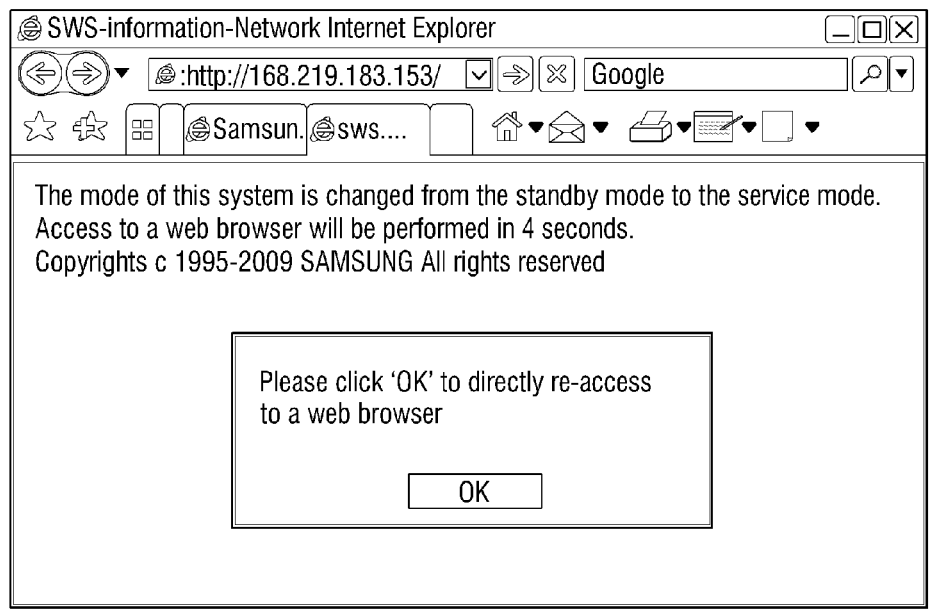
Figure 6C:
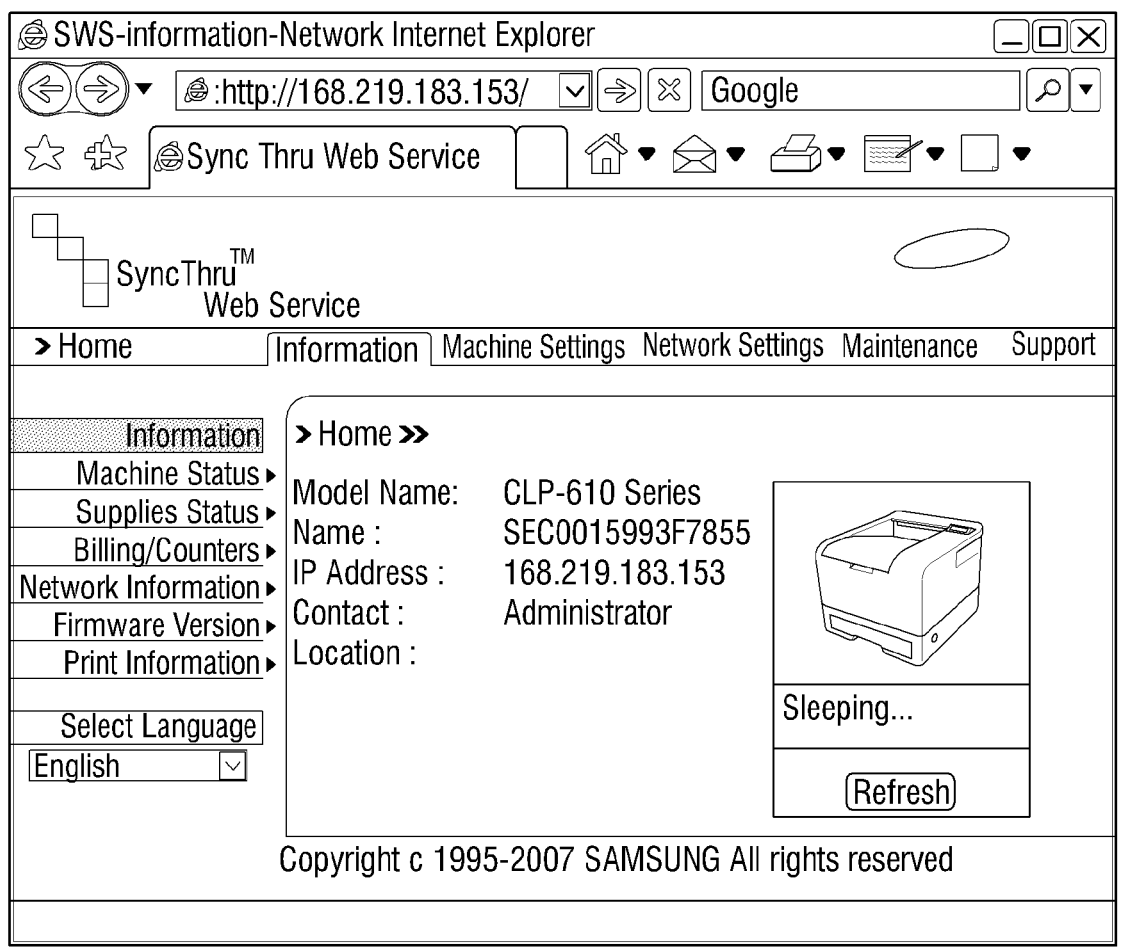

FIGS. 6A to 6C exemplarily illustrate web browsers according to an exemplary embodiment of the present general inventive concept.

FIG. 6A exemplarily illustrates a user's web browser displayed when the webpage as illustrated in FIG. 4 is transmitted to the web browser. In FIG. 6A, information to notify that a mode of a system is currently changed from the standby mode (namely, the low power mode) to the service mode (namely, the normal mode), and information regarding a time required for access to the web browser may be displayed on a screenshot of the webpage.

FIG. 6B exemplarily illustrates another web browser. In FIG. 6B, a window may be displayed which enables a user to enter a command when he or she desires to directly re-access to a web browser before a waiting time elapses.

FIG. 6C exemplarily illustrates another web browser to display a web page provided in the normal mode when an access to the web browser is finished. In FIG. 6C, an initial image to notify that the standby mode is shifted to the service mode may be displayed on the web browser, after the access to the web browser is finished.

Figure 7A:
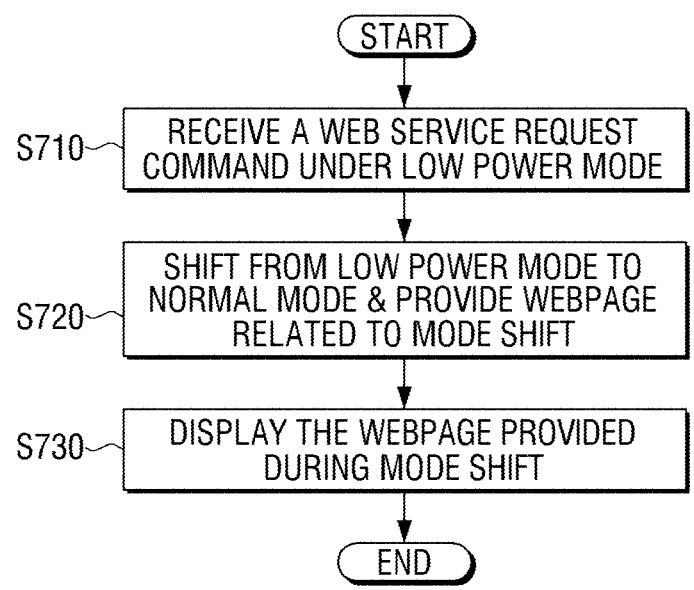
FIGS. 7A and 7B illustrate flowcharts of low-power mode control methods in the image forming system according to exemplary embodiments of the present general inventive concept.

FIG. 7A is a flowchart illustrating a low power mode control method in the image forming system according to an exemplary embodiment of the present general inventive concept.

According to the low power mode control method in the image forming system as illustrated in FIG. 7A, if a web service request command is received under the low power mode in operation S710, the low power mode is shifted to the normal mode, and a webpage related to the mode shift is provided in operation S720. Subsequently, the webpage provided during the mode shift is displayed in operation S730.

Herein, the webpage related to the mode shift may include a status display area to notify that the mode of the image forming system is currently shifted, and/or a re-access area to retry access to a web browser after a preset period of time elapses.

Additionally, a webpage may be created in real-time, or a webpage previously stored in a memory may be copied or simply loaded, so the created webpage or the copied or loaded webpage may be provided.

In more detail, in the low power mode, a webpage may be created and provided in real-time. Alternatively, a webpage created in the normal mode may be copied or simply loaded from a memory, and the copied or loaded webpage may be provided in the low power mode. Additionally, a webpage previously stored in a non-volatile memory such as a ROM may be copied or simply loaded, and the copied or loaded webpage may be provided in the low power mode.

Moreover, the first web server to provide a web service in the low power mode can have a function of processing the minimum HTTP protocol and a function of transmitting a webpage provided by a webpage providing module to a web browser.

The image forming system may be configured in such a manner that a main controller supports both the normal mode and the low power mode, or may be configured in such a manner that a main controller to support the normal mode and a sub-controller to support the low power mode are separately included.

If a main controller supports both the normal mode and the low power mode in the image forming system, the low power mode may be implemented in such a manner to reduce a frequency of the main controller or to configure gated clocks in designing a main controller so that blocks which are not operated in the low power mode may receive no clock inputs.

Additionally, a webpage providing module may be included on a main firmware configured to control the normal mode, or may be included together with the first web server on a micro firmware configured to control the low power mode. The main firmware and the micro firmware may be implemented in a single chip.

If the main firmware and the micro firmware are implemented in a single chip, the micro firmware may be loaded into the internal SRAM of the main controller. Since the SRAM retains information stored therein even when not refreshed, the SRAM is faster than the DRAM. Accordingly, in the SRAM, the low power mode may be rapidly shifted to the normal mode.

If the webpage providing module is included on the main firmware, the webpage providing module may create a webpage and store the created webpage in the normal mode. Additionally, the webpage providing module may copy or simply load the webpage stored in the low power mode to provide the copied or loaded webpage.

Alternatively, if the webpage providing module is included on the micro firmware (namely, the sub-firmware), the webpage providing module may create a webpage and provide the created webpage in the low power mode.

However, in some cases, the webpage providing module may copy or simply load a webpage stored as a default in manufacturing a non-volatile memory such as a ROM, rather than creating a webpage.

Furthermore, exemplary embodiments of the present general inventive concept may equally be applied to a situation in which the webpage providing module is included on both the main firmware and the micro firmware.

On the other hand, if the main firmware and the micro firmware are implemented in different chips in the image forming system, the low power mode may be implemented in such a manner to cut off the power to the main controller including the main firmware.

In this situation, if a webpage providing module is included on the main firmware, the webpage providing module may create a webpage to store the created webpage in the normal mode, under the control of the main controller. In the low power mode, the sub-controller may copy or simply load the stored webpage, and may provide the copied or loaded webpage under the control of the main controller.

Additionally, if the webpage providing module is included on the micro firmware (namely, the sub-firmware), the webpage providing module may create a webpage and provide the webpage in real-time in the low power mode.

However, in some cases, the webpage providing module may provide a webpage previously stored in manufacturing a non-volatile memory such as a ROM, rather than creating a webpage.

Furthermore, exemplary embodiments of the present general inventive concept may equally be applied to a situation in which the webpage providing module is included on both the main firmware and the micro firmware.

As described above, in a system in which a predetermined period of time is required during mode shift between a low power mode (namely, a standby mode) and a normal mode, if a web service request is received, a webpage including information to notify that an apparatus is in the low power mode and a script to automatically re-access to a web browser after a period of time required to enter the normal mode elapses may be transmitted to a client (namely, a web browser). Accordingly, the status of the apparatus may be displayed and at the same time a service may automatically be reopened, or the image-forming apparatus may automatically change to a normal, high-power mode, and thus a good quality service may be provided to a consumer.

While the image forming system has been described in the exemplary embodiments of the present general inventive concept, the image forming system is merely an example. Accordingly, exemplary embodiments of the present general inventive concept may also be applicable other electronic apparatuses capable of supporting a web service function.

Figure 7B:
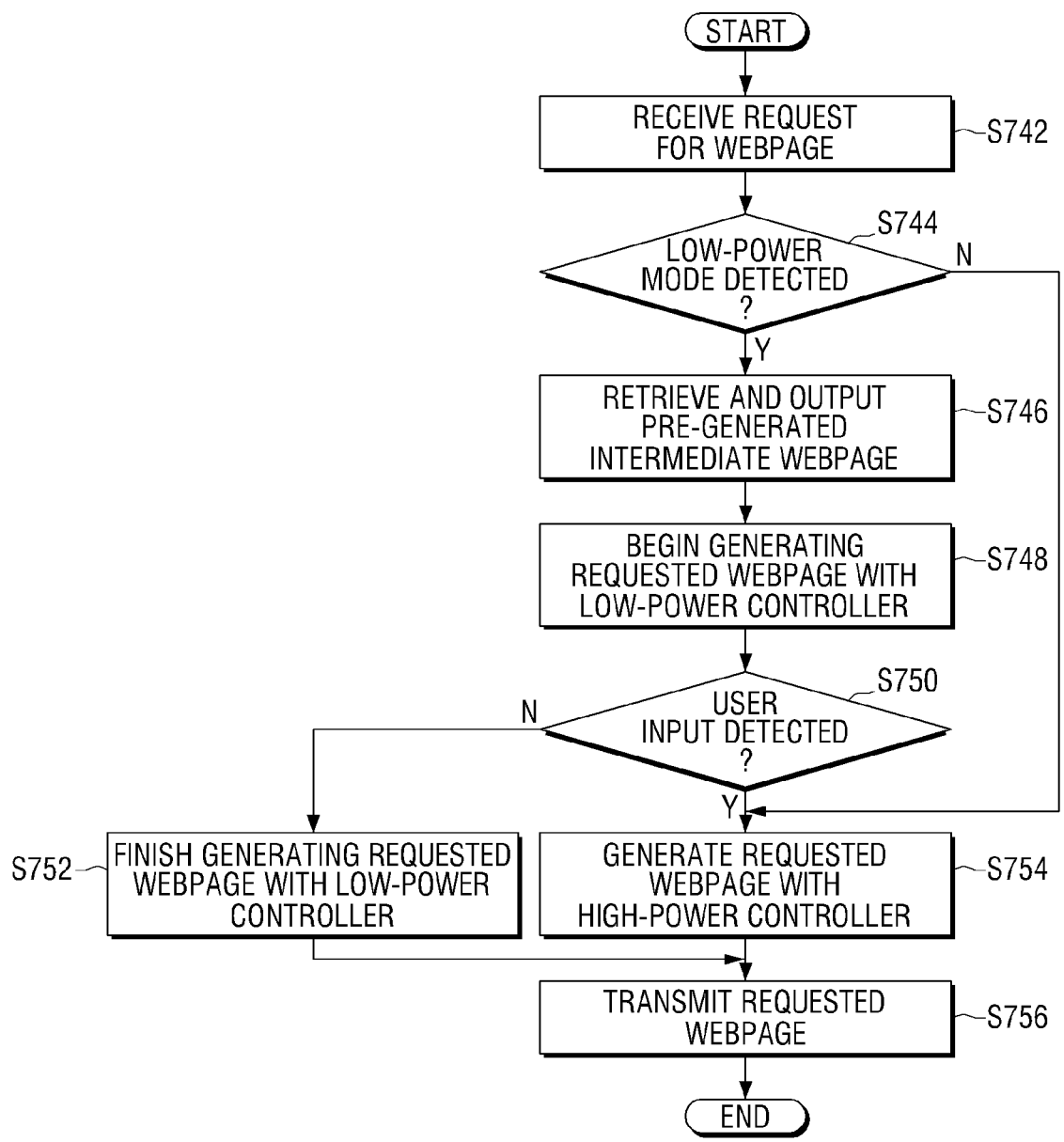

FIG. 7B illustrates flow diagram of a method of accessing a web page when an image-forming apparatus, device, or system is in a low-power mode. A request to access a webpage may be received in operation S742. For example, a webpage provider located in the image-forming apparatus may have a web-page stored or may be programmed to generate the requested webpage. The request may be received at a controller. If the request is received at a controller, the controller may determine in operation S744 whether the image-forming apparatus is in a low-power mode. If it is determined that the image-forming apparatus or system is in a low-power mode, a pre-generated webpage stored in memory may be output in operation S746. For example, a webpage provider may provide an address of the pre-stored webpage to a web server to output. The pre-stored webpage may include a message indicating that the requested webpage is being accessed or generated and may provide a user with an option to retrieve or generate the requested webpage in a high-power mode.

In operation S748, a low-power controller may begin to generate or access the requested webpage. In operation S750, the controller may determine whether a user input is detected to retrieve or generate the requested webpage in a high-power mode. If no user input is detected, the low-power controller finishes generating or accessing the requested webpage in operation S752 and transmits or outputs the requested webpage in operation S756. On the other hand, if a user input is detected in operation S750, a high-power controller may be used to generate the requested webpage in operation S754. The requested webpage may then be transmitted or displayed in operation S756.

The when the pre-generated webpage is displayed, a time may be estimated until the requested webpage would be completed in the low-power mode and in the high-power mode. If the pre-generated webpage includes an option to change to the high-power mode, the option may be controlled to disappear once the time to generate or retrieve the requested webpage in the low-power mode is less than or equal to the time to generate or retrieve the requested webpage in the high-power mode. For example, if it is estimated that it would take 10 seconds to generate the webpage in the low-power mode and only 3 seconds to generate the webpage in the high-power mode, the option to change to the high-power mode may be removed after 7 seconds have passed in the low-power mode.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming system to support a web service function, the image forming system comprising:
 a first web server operated under a low power mode to provide a web service to access at least one of a network and the Internet;
 a webpage provider to provide a webpage to be serviced through the first web server; and
 a controller to shift from the low power mode to a normal mode and to control the first web server to begin to provide the web service in the low power mode when a web service request command is received in the low power mode, such that the webpage provided by the webpage provider comprises a status display area to display a status message indicating that the low power mode is shifted to the normal mode.

2. The image forming system of claim 1, further comprising:
 a second web server operated under the normal mode to provide a web service,
 wherein the controller controls the second web server to provide a web service when a web service request command is received in the normal mode.

3. The image forming system of claim 1, further comprising:
 a display unit to display the webpage provided under the low power mode.

4. The image forming system of claim 1, wherein, when the controller controls the webpage provider to provide a webpage in the low-power mode, the webpage provider either provides a webpage previously created in the normal mode or creates and provides a webpage in real-time in the low power mode.

5. The image forming system of claim 1, wherein the webpage provider provides a webpage stored as a default.

6. The image forming system of claim 1, wherein the webpage provided by the webpage provider comprises a re-access area to retry access to a web browser after a preset period of time elapses,
 wherein the re-access area is written in at least one of a script language and an HTTP meta tag.

7. An image forming apparatus comprising:
 a user interface to receive a web service request command;
 a webpage provider to provide a webpage to be serviced under a low power mode; and
 a controller to shift from the low power mode to a normal mode and to operate and control a first web server to begin to service the webpage provided by the webpage provider in the low power mode in response to the web service request command being received in the low power mode,
 wherein the first web server is operated under the low power mode to provide a web service to access at least one of a network and the Internet, and the webpage provided by the webpage provider comprises a status display area to display a status message indicating that the low power mode is shifted to the normal mode.

8. The image forming apparatus of claim 7, wherein the controller operates and controls a second web server to provide a web service when the web service request command is received in the normal mode.

9. The image forming apparatus of claim 8, wherein at least one of the first web server and the second web server is located in the image forming apparatus.

10. The image forming apparatus of claim 7, wherein the webpage provided by the webpage provider is at least one of a webpage previously created in the normal mode, a webpage created in real-time in the low power mode, and a webpage stored as a default.

11. The image forming apparatus of claim 7, wherein the webpage provided by the webpage provider comprises a re-access area to retry access to a web browser after a preset period of time elapses,
   wherein the re-access area is written in at least one of a script language and an HTTP meta tag.

12. A low power mode control method in an image forming system to support a web service function, the method comprising:
   receiving a web service request command under a low power mode;
   switching, in response to the web service request command being received in the low power mode, from the low power mode to a normal mode while first providing a webpage related to the mode switch while in the low power mode; and
   displaying the provided webpage during the mode switch, wherein a web service for the web page is provided to access at least one of a network and the Internet such that the webpage related to the mode switch comprises a status display area to display a status message indicating that the low power mode is switched to the normal mode.

13. The method of claim 12, wherein a web service in the low power mode and a web service in the normal mode are provided by different web servers.

14. The method of claim 12, wherein the webpage provided in the low power mode is a webpage previously created in the normal mode.

15. The method of claim 12, wherein the webpage provided in the low power mode is a webpage created in real-time in the low power mode.

16. The method of claim 12, wherein the webpage provided in the low power mode is a webpage stored as a default.

17. The method of claim 12, wherein the webpage related to the mode switch comprises a re-access area to retry access to a web browser after a preset period of time elapses,
   wherein the re-access area is written in at least one of a script language and an HTTP meta tag.

18. An image-forming apparatus having a high-power operation mode and a low-power operation mode, the image-forming apparatus comprising:
   a webpage provider to provide a webpage in each of the high-power and low-power modes;
   a first web server to receive the webpage from the webpage provider in the low-power mode while shifting from the low power mode to a normal mode and to output the webpage to a network; and
   a display to receive the webpage from the first web server and to display the webpage such that the webpage comprises a status display area to display a status message indicating that the low power mode is shifted to the normal mode.

19. The image-forming apparatus according to claim 18, wherein the webpage provider provides a pre-generated webpage stored in memory when the image-forming apparatus is in the low-power mode.

20. The image-forming apparatus according to claim 18, further comprising a second web server to receive the webpage from the webpage provider when the image-forming apparatus operates in the high-power operation mode.

21. The image-forming apparatus according to claim 18, further comprising:
   a controller to receive a request to access the webpage and to transmit the request to the first web server.

22. The image-forming apparatus according to claim 21, wherein the controller includes a first controller to operate at a high power level in the high-power operation mode and a second controller to operate at a low power in the low-power operation mode.

23. The image-forming apparatus according to claim 22, wherein, when the image-forming apparatus is in a low-power state, the first controller generates the webpage according to data received from the webpage provider and transmits the webpage to the first web server.

24. The image-forming apparatus according to claim 18, wherein each of the webpage provider and the first web server is a component located inside a body of the image-forming apparatus.

25. The image-forming apparatus according to claim 24, wherein at least one of the webpage provider and the first web server includes a computer program stored in a memory and a processor to access data from the computer program to provide or receive the webpage, respectively.

26. The image-forming apparatus according to claim 18, further comprising:
   a controller including a first controller to operate at a high power level in the high-power operation and a second controller to operate at a low power in the low-power operation,
   wherein the webpage includes a first webpage and a second webpage,
   when the image-forming apparatus is in a low-power operation mode, the second controller transmits the first webpage received from the webpage provider to the display, and
   after the first webpage received from the webpage provider is transmitted to the display, if an input is received by the controller to generate the second webpage in the high-power operation mode, the first controller generates the second webpage in the high-power operation mode based on webpage data received from the webpage provider.

27. A method to provide a webpage from an image-forming system having a high-power mode and a low-power mode, the method comprising:
   receiving a request to transmit a requested webpage from a webpage provider in the image-forming system;
   determining whether the image-forming system is in the high-power mode or the low-power mode; and
   if the image-forming system is in the low-power mode, changing to the high-power mode to provide the requested webpage in response to the request to transmit the requested webpage being received in the low power mode,
   wherein a web service for the webpage is provided to access at least one of a network and the Internet such that the webpage comprises a status display area to display a status message indicating the mode change.

28. The method according to claim 27, wherein providing the requested webpage includes one of retrieving a pre-generated webpage from memory and generating a webpage based on data in the request to transmit the requested webpage.

29. The method according to claim 27, further comprising:
   if it is determined that the image-forming system is in the low-power mode, retrieving a pre-generated webpage from memory; and
   if it is determined that the image-forming system is in the high-power mode, generating the requested webpage based on data in the request to transmit the requested webpage.

30. The method according to claim 27, further comprising:
if it is determined that the image-forming system is in the low-power mode, retrieving a pre-generated webpage from memory, the pre-generated webpage having a field to receive a user input to change the image-forming system to the high-power mode to generate the requested webpage.

31. The method according to claim 30, wherein, if a user input is detected before the requested webpage is provided in the low-power mode, changing to the high-power mode to provide the requested webpage.

32. A method to provide a webpage from an image-forming system having a high-power mode and a low-power mode, the method comprising:
receiving a request to transmit a requested webpage from a webpage provider in the image-forming system;
determining whether the image-forming system is in the high-power mode or the low-power mode;
if the image-forming system is in the low-power mode, beginning to generate the requested webpage in the low-power mode while shifting from the low-power mode to the high power mode;
if an input is received before the requested webpage is generated, switching to the high-power mode to generate the requested webpage; and
displaying a status message in a display area of the webpage indicating the mode change,
wherein a web service for the webpage is provided to access at least one of a network and the internet.

33. The method according to claim 32, further comprising:
transmitting a pre-generated webpage before generating the requested webpage.

* * * * *